(12) United States Patent
Machida

(10) Patent No.: US 8,520,323 B2
(45) Date of Patent: Aug. 27, 2013

(54) REDUCING MICRO-DEFECTS IN FRESNEL LENSES

(75) Inventor: Akihiro Machida, Sunnyvale, CA (US)

(73) Assignee: Prysm, Inc., San Jose, CA (US)

( * ) Notice: Subject to any disclaimer, the term of this patent is extended or adjusted under 35 U.S.C. 154(b) by 147 days.

(21) Appl. No.: 13/223,089

(22) Filed: Aug. 31, 2011

(65) Prior Publication Data

US 2013/0050851 A1     Feb. 28, 2013

(51) Int. Cl.
*G02B 3/08*    (2006.01)
*B05D 5/06*    (2006.01)
*B05D 3/00*    (2006.01)

(52) U.S. Cl.
USPC .................... 359/742; 427/164; 427/553

(58) Field of Classification Search
USPC .................. 359/742, 743; 427/164, 553
See application file for complete search history.

(56) References Cited

U.S. PATENT DOCUMENTS

2009/0291206 A1*  11/2009  Jiang ........................ 427/164

* cited by examiner

*Primary Examiner* — William Choi
(74) *Attorney, Agent, or Firm* — Fish & Richardson P.C.

(57) ABSTRACT

Methods, systems, and apparatus for correcting micro-defects on a Fresnel lens surface are described. In one aspect, a measured amount of fluid coating material is applied to the grooved side of a Fresnel lens body, such that in addition to a thin layer of fluid coating material adhering to the surfaces of lens facets and the draft facets of the Fresnel lens body, some of the liquid coating material pools at the bottom corners of the grooves and forms a curved meniscus thereat. The pooled liquid coating material fills out the micro-defects existing in the bottom corners of the grooves. The surface profile of the liquid coating material traces closely to the designed profile of the Fresnel lens body. When the liquid coating material solidifies, the resulting solid coating serves to reduce the undesirable optical effects of the micro-defects in the bottom corners of the Fresnel lens body.

21 Claims, 5 Drawing Sheets

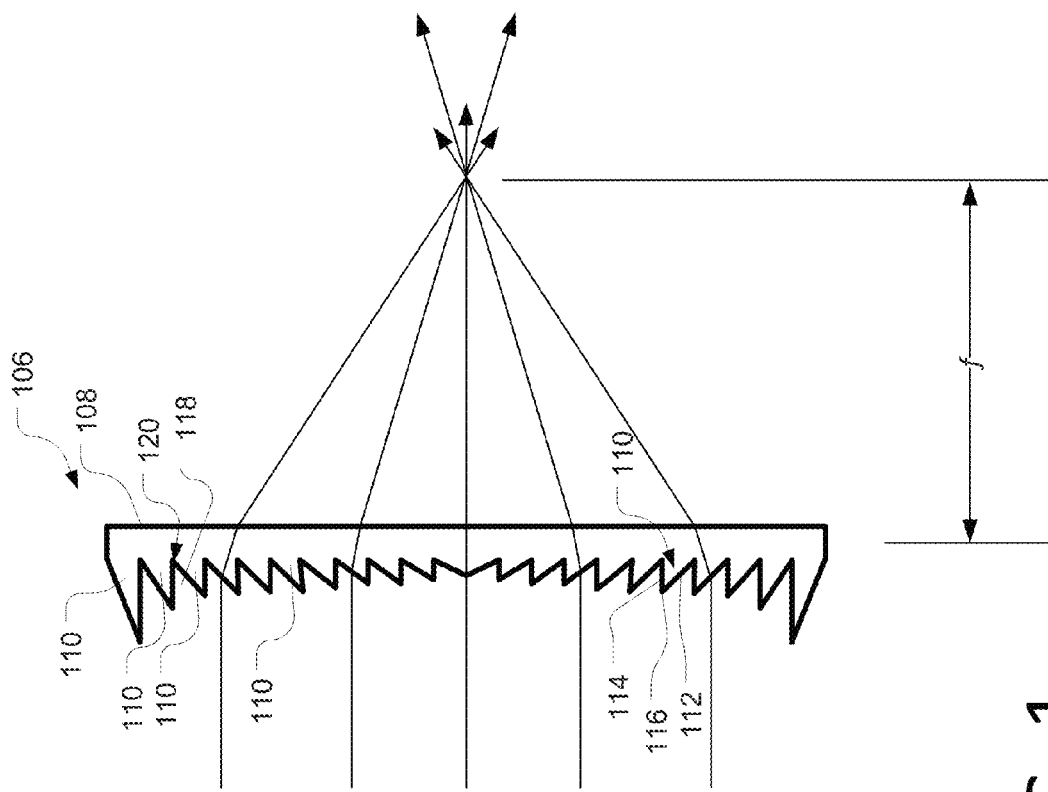
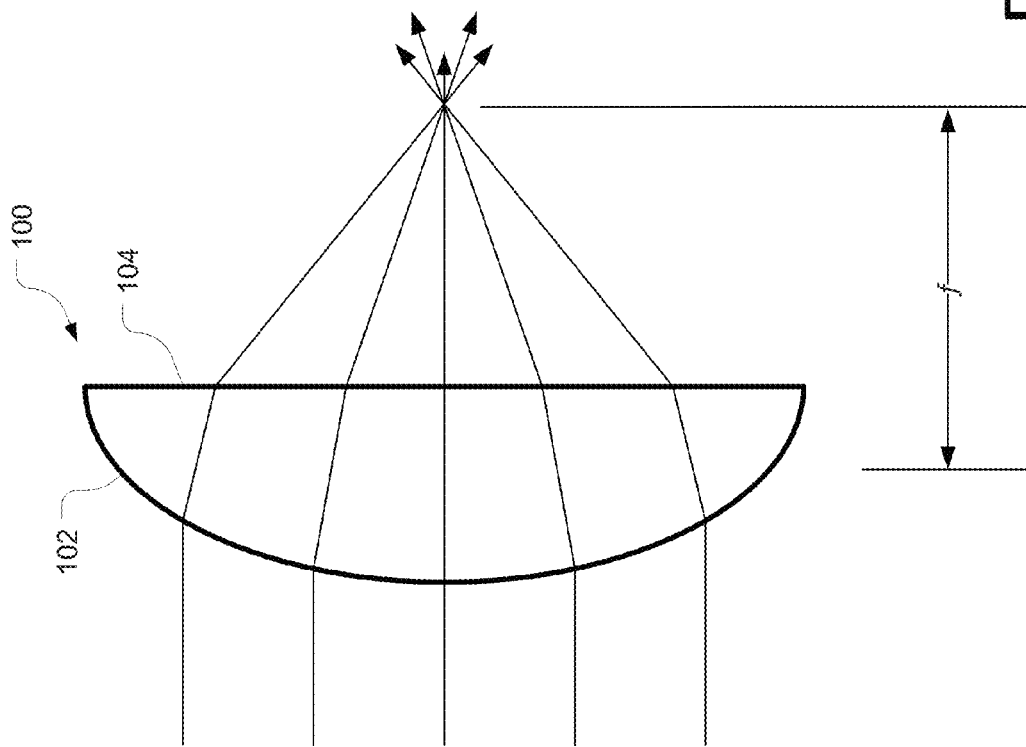
FIG. 1

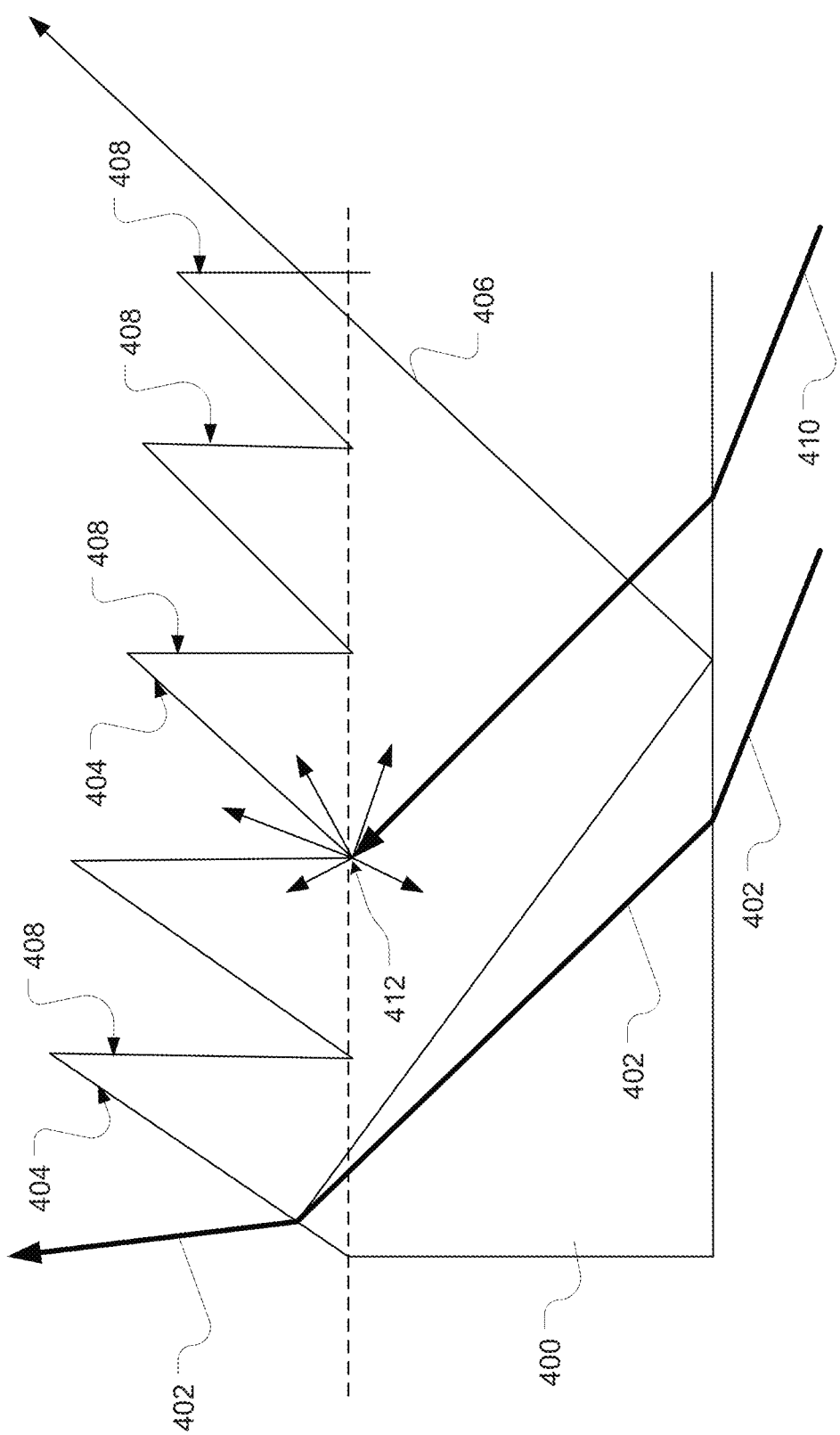

REDUCING MICRO-DEFECTS IN FRESNEL LENSES

BACKGROUND

This specification relates to optical components having small feature sizes.

A Fresnel lens is an optical component that can be used as a cost-effective, lightweight alternative to conventional continuous surface optical lenses (e.g., spherical lenses) in many applications. The refractive power of a continuous surface optical lens is provided by the optical interfaces at the continuous lens surfaces. To obtain a thinner lens (e.g., a Fresnel lens) having approximately the same refractive power as the continuous surface lens, lens material (e.g., glass) can be removed from the continuous surface lens while the optical interfaces of the continuous surface lens are maintained.

A practical implementation of an optical equivalent for a continuous surface lens, such as a Fresnel lens, is a multi-segment lens that has a finite prism pitch. For example, the smoothly curved lens surface of the continuous surface optical lens can be segmented, and the lens segments can each be approximated by a respective sloped lens facet and "collapsed" onto the same base plane. From a cross-section, each segment of the multi-segment lens forms a ridge above the planar base surface of the multi-segment lens, and each ridge has a sloped lens surface on one side and a nearly vertical draft surface on the opposite side. The sloped lens surface and the nearly vertical draft surface meet at the apex of the ridge. Each pair of adjacent ridges form a groove or valley above the planar base surface of the multi-segment lens, where the sloped lens surface of one ridge meets the draft surface of the adjacent ridge at the bottom corner of the groove or valley.

When designing a Fresnel lens, the pitch and the slopes of the lens surfaces and draft surfaces are carefully chosen to achieve a desired optical power, thickness, and transmission efficiency of the Fresnel lens.

SUMMARY

This specification describes, among others, examples and implementations of techniques and structures that reduce the loss of contrast and transmission due to micro-defects in Fresnel lenses.

Micro-defects can exist in various parts of a Fresnel lens structure due to the variability and imperfections in the materials and manufacturing techniques used to produce the Fresnel lens structure. The micro-defects are mall and non-uniform deviations in various parts of the lens body and surfaces from the original lens design. These deviations introduce undesirable optical effects (e.g., loss of transmission efficiency, distortion, ghost images, loss of contrast, etc.) in the transmitted light. Among the micro-defects on the Fresnel lens body, surface and shape irregularities that exist in the bottom corners of the grooves in the Fresnel lens surface are more prominent and can cause significant scattering of the incident light, leading to significant loss in contrast and transmission in the light passing through the Fresnel lens.

To reduce the undesirable effects of the surface and shape irregularities in the bottom corners of the lens grooves, a measured amount of liquid coating material is applied to the grooved side of the Fresnel lens. The consistency and quantity of the liquid coating material is chosen such that the liquid coating material can flow to and pool at the bottom corners of the grooves in the Fresnel lens surface. The liquid coating material pooled in the bottom corners of the lens grooves form small meniscuses at locations slightly above the regions where the surface and shape irregularities are most prominent and prevalent (e.g., the lower $\frac{1}{50}$-$\frac{1}{10}$ of the total groove depth). When the liquid coating material is dried, it solidifies in the bottom corners of the lens grooves in the Fresnel lens surface and fills out the surface and shape irregularities in the bottom corners of the lens grooves.

As a result of the solidified coating material filling out the surface and shape irregularities in the bottom corners of the lens grooves, the undesirable effects of the surface and shape irregularities in the Fresnel lens can be reduced. At the same time, the filled portion of the grooves account for only a small fraction of the total depth of the lens grooves, and the coating thickness over the surfaces of the grooves above the filled portion remain very thin. Therefore, the coating does not substantially interfere with the designed operation of the Fresnel lens.

In one aspect, A method for forming a Fresnel lens with corrected micro-defects includes: obtaining a Fresnel lens body, the Fresnel lens body including a unitary body of lens material shaped into a plurality of raised lens segments on a planar base, each pair of adjacent raised lens segments on the planar base forming a respective groove in a first side of the Fresnel lens body above the planar base, and respective bottom corners of the grooves including surface or shape irregularities deviating from respective designed surfaces of the grooves; applying a measured amount of the liquid coating material on the first side of the Fresnel lens body, where the measured amount of liquid coating material forms a meniscus within each of the respective bottom corners of the grooves; and solidifying the liquid coating material applied on the first side of the Fresnel lens body such that at least some of the liquid coating material below the meniscuses solidifies within and fills the surface or shape irregularities in the respective bottom corners of the one or more of the respective grooves.

In some implementations, the method further includes: shaping a malleable material using a solid mold to form the plurality of raised lens segments on the planar base; causing the malleable material to harden within the solid mold to form the unitary body of lens material; and removing the unitary body of lens material from the mold to form the Fresnel lens body, where the surface or shape irregularities include defects caused by existing damages in the solid mold or by unclean removal of the Fresnel lens body from the solid mold.

In some implementations, the malleable material is an acrylic paste.

In some implementations, the defects have dimensions between approximately 100 nanometers to 10 microns.

In some implementations, the solid mold is made of metal and includes a plurality of ridges that is operable to press into the malleable material to form the respective grooves in the first side of the Fresnel lens substrate, and wherein respective tips of the plurality of ridges include micro-deformities that caused at least some of the shape irregularities in the respective bottom corners of the grooves.

In some implementations, the method further includes: applying the measured amount of the liquid coating material on the first side of the Fresnel lens body further comprises spray coating the first side of the Fresnel lens body with the measured amount of liquid coating material.

In some implementations, the liquid coating material is a suspension of micro-particles made of a low-refractive index material.

In some implementations, the measured amount of liquid coating material forms a uniform coating of 200 nm to 150 nm thick over surfaces of the plurality of raised lens segments, in addition to the meniscuses in the respective bottom corners of the grooves.

In some implementations, each respective groove between a pair of adjacent lens segments has a width of approximately 50-100 microns.

In another aspect, a Fresnel lens with corrected micro-defects includes a unitary body of solid lens material shaped into a plurality of raised lens segments on a planar base, each pair of adjacent raised lens segments on the planar base forming a respective groove in a first side of the unitary body above the planar base, and respective bottom corners of the grooves including surface or shape irregularities that deviate from respective designed surfaces of the grooves; and a layer of solid coating the first side of the unitary body of solid lens material, the layer of solid coating material including flat portions over respective upper portions of the plurality of raised lens segments and protruded portions extending into the respective bottom corners of the grooves and filling the surface or shape irregularities in the respective bottom corners of the grooves.

In some implementations, the layer of solid coating material comprises a low-refractive index material.

In some implementations, the unitary body of solid lens material is acrylic or glass.

In some implementations, the protruding portions have dimensions between approximately 2-10 microns.

In some implementations, the flat portions have a thickness of approximately 20 nm-150 nm.

In some implementations, each respective groove between a pair of adjacent lens segments has a width of approximately 50-100 microns.

In some implementations, an exposed surface of the layer of solid coating provides an optical interface that approximates a designed optical interface provided by the designed surfaces of the grooves in the respective bottom corners of the grooves.

In another aspect, a method includes: directing input light to a Fresnel lens, where the Fresnel lens includes (1) a unitary body of solid lens material shaped into a plurality of raised lens segments on a planar base, each pair of adjacent raised lens segments on the planar base forming a respective groove in a first side of the unitary body above the planar base, and respective bottom corners of the grooves including surface or shape irregularities that deviate from respective designed surfaces of the grooves; and (2) a layer of solid coating the first side of the unitary body of solid lens material, the layer of solid coating material including flat portions over respective upper portions of the plurality of raised lens segments and protruded portions extending into the respective bottom corners of the grooves and filling the surface or shape irregularities in the respective bottom corners of the grooves. The method further includes: receiving output light from the Fresnel lens, where the output light includes light that has passed through the surface and shape irregularities of the grooves and been refracted by the protruded portions of the layer of solid coating material, and wherein the light is refracted by the protruded portions into respective directions that approximate respective directions prescribed by the designed surfaces of the grooves.

In some implementations, the layer of solid coating material comprises a low-refractive index material.

In some implementations, the protruding portions have dimensions between approximately 2-10 microns.

In some implementations, the flat portions have a thickness of approximately 20 nm-150 nm.

In some implementations, each respective groove between a pair of adjacent lens segments has a width of approximately 50-100 microns.

Particular implementations of the subject matter described in this specification can be implemented to realize one or more of the following advantages.

By filling the surface and shape irregularities (e.g., voids, fractures, protrusions) on the lens and draft surfaces in the bottom corners of the lens grooves in the Fresnel lens surface, scattering of light due to these surface and shape irregularities can be reduced. More light rays that enter the Fresnel lens can follow the paths prescribed by the original lens design, rather than being scattered to unpredictable directions by the surface and shape irregularities. Therefore, when the Fresnel lens is used in a display screen, image brightness and image contrast can be improved, and color distortion and ghost images can be reduced.

In addition, only the a small region at the bottom corners of the lens grooves in the Fresnel lens surface is filled by the solidified coating material, and the coating on the lens facet and the draft facet above the filled portion remains very thin (e.g., a few percent) in comparison to the coating filling the bottom corners of the grooves. Therefore, the coating has negligible impact on the designed operation of the Fresnel lens.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a block diagram illustrating an example Fresnel lens design for replacing a continuous surface spherical lens.

FIG. 2C shows the surface and shape irregularities in the resulting Fresnel lens due to manufacturing variability.

FIG. 4 is a block diagram illustrating the scattering of impinging light by surface and shape irregularities on a Fresnel lens surface.

Like reference numbers and designations in the various drawings indicate like elements.

DETAILED DESCRIPTION

Figure 2A:
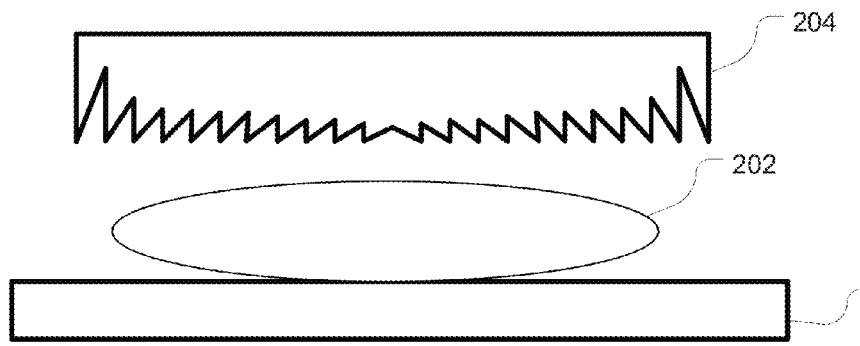
FIGS. 2A-2C are block diagrams illustrating an example manufacturing process for making a Fresnel lens according to the example Fresnel lens design shown in FIG. 1.

Fresnel lenses can serve as thinner and lighter alternatives for continuous surface lenses in many applications. The design of a Fresnel lens for replacing a continuous surface lens is based on the principle that the refractive power of a continuous surface lens is provided by the optical interfaces at the surfaces of the continuous surface lens. By segmenting the smooth curved surface of the continuous surface lens and collapsing the segmented surface onto a common base plane, the overall thickness of the lens can be reduced while the refractive power of lens is substantially preserved.

FIG. 1 is a block diagram illustrating a Fresnel lens design for replacing a convex spherical-plano lens 100.

As shown in FIG. 1, the spherical-plano lens 100 has two refractive surfaces, the smoothly curved surface 102 and the flat plano surface 104. When a light ray enters the curved lens surface 102 at an oblique angle, the light ray is refracted or bent to a different direction depending on the relative refractive index of the lens material to the medium surrounding the lens 100. Similarly, when the light ray exits the plano surface 104, the light ray is refracted again. The overall refractive power of the continuous surface lens 100 is the combined refractive power of the curved surface 102 and the plano surface 104, and can be summarized by the focal length f of the lens 100.

FIG. 1 also shows that when the continuous lens surface 102 is segmented (e.g., into concentric strips) and each segment is brought closer to the plano lens surface 104, a multi-segment lens 106 having a plano base surface 108 and multiple concentric lens segments 110 raised above the plano base surface 108 is produced. Each segment 110 has a sloped lens facet 112 that mimics the refractive property of a corresponding portion on the curved lens surface 102 of the continuous surface lens 100. The sloped lens facet 112 can be a substantially flat surface when the segment is small and narrow, or maintain a curvature similar to its corresponding portion on the curved lens surface 102 if the segment is large and wide relative to the overall size of the lens 100. Each segment 110 also has a draft facet 114 that is designed to be optically inactive in terms of refractive power, but serves to bring the lower end of the adjacent lens segment to the plano base surface 108 of the multi-segment lens 106.

Typically, the slope of each lens facet 112 of the multi-segment lens 106 departs slightly from that of its corresponding portion on the curved surface lens 100 due to the closer distance between the lens facet 110 and the plano base surface 108 on the multi-segment lens 106. The refractive property of the plano base surface 108 in the multi-segment lens 106 is unchanged from the plano base surface 104 of the continuous surface lens 100. The draft facet 114 is nearly vertical relative to the plano base surface 108. The draft facet 114 serves to bring the sloped lens facet 112 close to the plano base surface 108, but does not contribute to the overall refractive power of the multi-segment lens 106. Therefore, the overall refractive property of the multi-segment lens 106 is substantially unaltered from that of the continuous surface lens 100, but the overall thickness and weight of the lens is reduced significantly, as shown in FIG. 1.

In FIG. 1, each segment 110 of the multi-segment lens 106 forms a raised ridge above the plano base surface 108. Each raised ridge has an apex 116 at which the sloped lens facet 112 meets with the draft facet 114. In addition, between each pair of adjacent ridges 110, a valley or groove 118 is formed over the plano base surface 108. The sloped lens facet 112 of one ridge in the pair of adjacent ridges meets with the draft surface 114 of the other ridge in the pair at the bottom corner 120 of the valley or groove 118. In the example design shown in FIG. 1, the multi-segment lens 106 includes a series of concentric ridges 110 above the plano base surface 108. Alternatively speaking, the multi-segment lens 106 includes a series of grooves 118 cut into a plano base surface 108. The multi-segment lens 106 is also called a "Fresnel lens."

Although the example continuous surface lens shown in FIG. 1 is a convex lens having one convex surface and one plano surface, Fresnel lenses for replacing continuous surface lenses having other kinds of continuous surface profiles can be designed similarly. Typically, each Fresnel lens includes a grooved side and a plano side. On the grooved side of each Fresnel lens, sloped lens facets refract light rays in a prescribed manner and draft facets serve to bring the sloped lens facets close to the plano base plane.

Typically, each Fresnel lens can be characterized by design parameters including the prism pitch of the lens segments (e.g., ridges or grooves) and the slope angles and draft angles for the lens segments.

The prism pitch of the lens segments represents the distance between each pair of adjacent ridges or grooves on the grooved side of the Fresnel lens. The slope angle of each ridge or groove represents the angle between the lens facet of the ridge or groove and the plano base surface. The slope angle of a lens facet is typically chosen to mimic the slope of a portion on a continuous lens surface that corresponds to the lens facet. The draft angle of each ridge or groove represents the angle between the draft facet of the ridge or groove and the plane normal to the plano base plane. A draft angle of zero degree is often preferred for reducing transmission losses from the draft facets. However, sometimes, a small non-zero draft angle is adopted for Fresnel lenses made using a mold to facilitate the release of the lens from the mold.

The prism pitch, draft angles, and slope angles of a Fresnel lens determine the heights of the ridges, or equivalently, the depths of the grooves, on the grooved side of the Fresnel lens. The prism pitch, draft angles, and slope angles also determine the sharpness of the peaks of the ridges, or equivalently, the narrowness of the bottom corners of the grooves, on the grooved side of the Fresnel lens.

Fresnel lenses can be in many applications that require lenses that are thin and light weight. For example, a Fresnel lens can be used as a layer in a display to couple light (e.g., excitation light) from a light source into another layer (e.g., a fluorescent imaging layer) in the display. In different applications, design parameters such as the prism pitch, draft angles, slope angles, and/or overall size of the Fresnel lens can be constrained by various considerations in addition to the refractive power of the Fresnel lens.

For example, in a display, the prism pitch should be small enough such that the grooves of the Fresnel lens are below the resolving power of the human eye at a typical viewing distance. At the same time, the prism pitch should be large enough such that the spatial periodicity of the grooves does not cause an interference pattern to emerge in the excitation light and cause visual artifacts in the images formed on the display. Similarly, the display thickness requirements may set a limit on the prism pitch as well, since a larger prism pitch corresponds to a larger thickness of the Fresnel lens.

As a more specific example, a Fresnel lens used in a florescent display can have a prism pitch of 50-100 microns (e.g., 80 microns). The slope angles of the lens facets can range from 40 degrees (e.g., 35 degrees) near the edge to nearly zero in the center of the Fresnel lens. The prism heights of the ridges near the edge of the Fresnel lens can range from 20-60 microns (e.g., 42 microns). The overall size of the Fresnel lens can depend on the size of the display, and can range from a few inches (e.g., 10 inches or 12 inches) to hundreds of inches (e.g., 120 inches or 600 inches).

Depending on the feature sizes of the Fresnel lens for each particular application, different manufacturing techniques may be adopted to produce the Fresnel lens according to the specifications of a lens design. In some applications, the prism pitches of the Fresnel lenses can be rather large and overall performance requirements are not upset by small imprecisions in the shapes and sizes of the ridges or grooves in the Fresnel lens surface. For example, a Fresnel lens can be used in a light house beacon or a vehicle headlight to produce columnized light beams from a light bulb placed at the focal point of the Fresnel lens. A Fresnel lens having feature sizes (e.g., prism pitches or ridge heights) in the range of 0.5 cm to 50 cm can be sufficient for such purposes. The Fresnel lens can be made by pressing molten glass or plastic using a metal mold. Any irregularities existing in the shape or surface of the pressed Fresnel lens do not significantly degrade the function of the Fresnel lens for these purposes.

In contrast, in some applications (e.g., in a florescent display), Fresnel lenses having micro-sized features (e.g., feature sizes in the range of approximately 50-100 microns) are required. In such applications, surface and shape irregularities resulted from the state of art manufacturing technologies can be sufficiently large relative to the feature size of the Fresnel lens to cause an unacceptable level of degradations to the functions of the Fresnel lens. Therefore, techniques for correcting the irregularities, or at least reducing some of the undesirable effects of the irregularities, are needed. Although specific dimensions for Fresnel lenses suitable for use in displays are disclosed for illustrative purposes, in general, the techniques described in this specification are useful in reducing the undesirable optical effects of micro-defects in other applications where the dimension of the micro-defects are non-negligible in comparison to the Fresnel lens feature sizes.

Figure 2B:
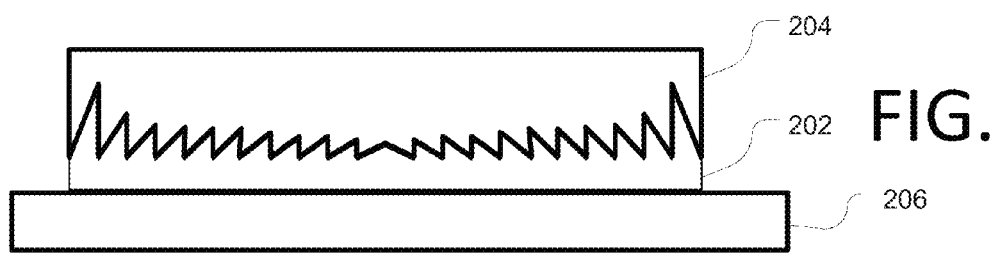
Figure 2C:
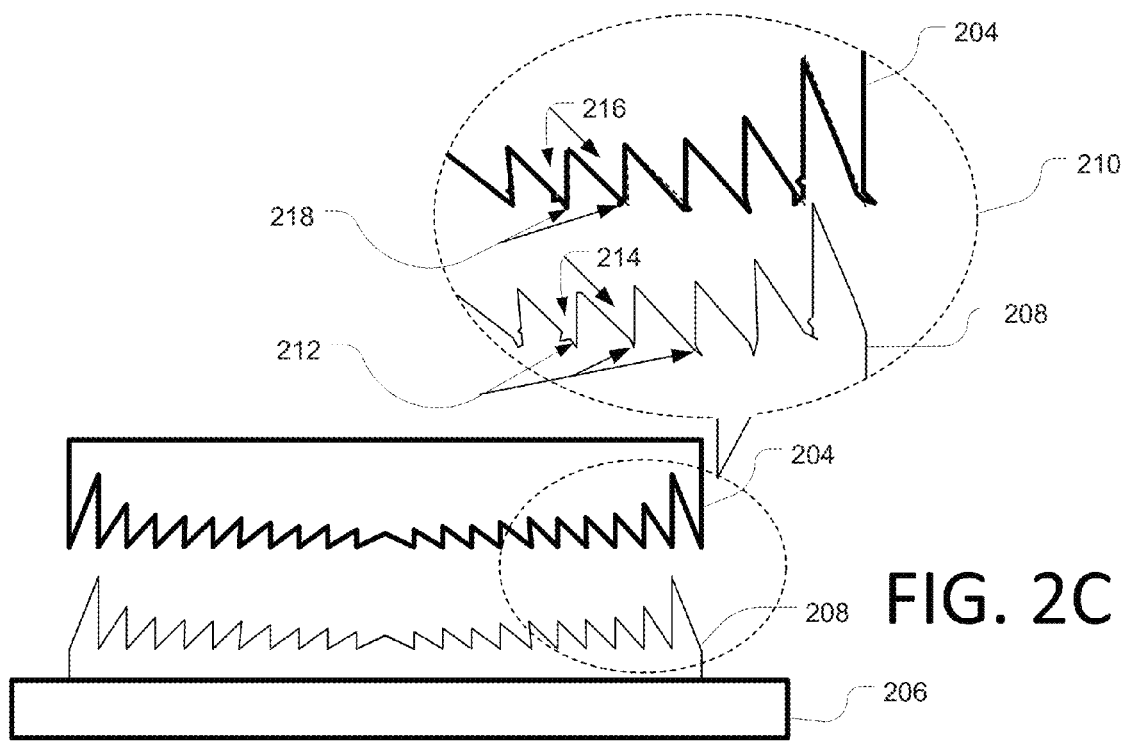

FIGS. 2A-2C illustrate an example manufacturing method to produce a Fresnel lens from molten glass or plastic using a solid mold (e.g., a metal mold). The mold used to form the Fresnel lens can be created using various precision machining techniques. For example, a diamond saw or grinding wheel having a sharp edge can be used to cut out grooves and ridges in a metal work piece according to a specification, such that the resulting profile of the metal work piece is an exact negative of the grooved side of a desired Fresnel lens. Once the metal work piece has been cut into the correct shape, it can be used as part (e.g., an upper die) of a mold to form the Fresnel lens.

As shown in FIG. 2A, a volume of raw material 202 (e.g., glass, acrylic, or various types of clear plastics) is set between an upper die 204 and a lower die 206 of a solid mold. The lower die 206 has a planar upper surface for shaping the plano surface of the Fresenel lens to be made. The upper die 204 has a lower surface that has been machined or shaped to adopt an exact negative profile of the Fresnel lens to be made. The volume of raw material 202 can be heated either before or after it was placed between the upper die 104 and the lower die 106 so that the raw material 202 becomes malleable. Then the volume of raw material 202 is pressed between the upper die 204 and the lower die 206. The load from the die pieces causes the volume of raw material 202 to take on the shape prescribed by the surface profiles of the upper die 204 and lower die 206, as shown in FIG. 2B. Then, the dies and the raw material 202 are cooled until the raw material hardens. Finally, the upper die 204 is lifted and the Fresnel lens shape 208 is released from the mold. In some implementations, the inner surfaces of the dies 204 and 206 are treated with a special coating for easier release of the Fresnel lens shape 208. The released Fresnel lens shape 208 has the profile according to specified design parameters embodied in the profiles of upper and lower dies 204 and 206.

Theoretically, the Fresnel lens shape 208 that comes out of the dies 204 and 206 should have the exact profile as specified in the original Fresnel lens design. However, various imperfections and limitations of the manufacturing processes can cause variability in the resulting lens shapes. In particularly, as shown in the enlarged window 210 in FIG. 2C, the bottom portions 212 of the grooves 214 on the grooved side of the Fresnel lens shape 208 can deviate from their expected directions and shapes. These deviations can be present in the form of voids (e.g., small indentations relative to the designed plane of the lens facet or draft facet), protrusions (e.g., small fragments of the lens material or debris protruding from the designed plane of the lens facet or draft facet), fractures (e.g., small cracks in the lens material in the designed plane of the lens facet or draft facet), and combinations of the above. Although these deviations may be found anywhere on the surface of the Fresnel lens shape, the concentration of the deviation sites increase significantly near the bottom corners of the grooves on the grooved side of the Fresnel lens shape 208 due to the narrowness of the space in the bottom corners.

The deviations can be the result of different factors, or a combination of multiple factors. For example, the die (e.g., the upper die 204) that includes the micro-sized ridges 216 for pressing into the molten Fresnel lens material can be made of metal. The tips 218 of these micro-sized metal ridges 216 can have dimensions in the range of a micron or less. These tips 218 can easily be damaged or bent when they come into contact with other objects, such as the molten glass or plastic. The damage and bent can be small and irregularly shaped, and can cause similar small irregularities in the Fresnel lens shape 208 that is formed in the die. For example, the resulting bottom corners 212 of the grooves 214 in the grooved sided of the Fresnel lens shape 208 can be bent away from their designed directions, or become deeper or shallower than their designed depths.

In addition, when the Fresnel lens shape 208 is released from the mold, unclean removal can also cause irregularities on the surface of the Fresnel lens shape 208, especially in the bottom corners of the grooves 214 in the grooved side of the Fresnel lens shape 208. The tips 218 of ridges 216 on the mold can also cause additional damages (e.g., scratches and punctures) to the lens facets near the bottom corners 212 of the grooves 214 in the Fresnel lens shape 208.

Figure 3:
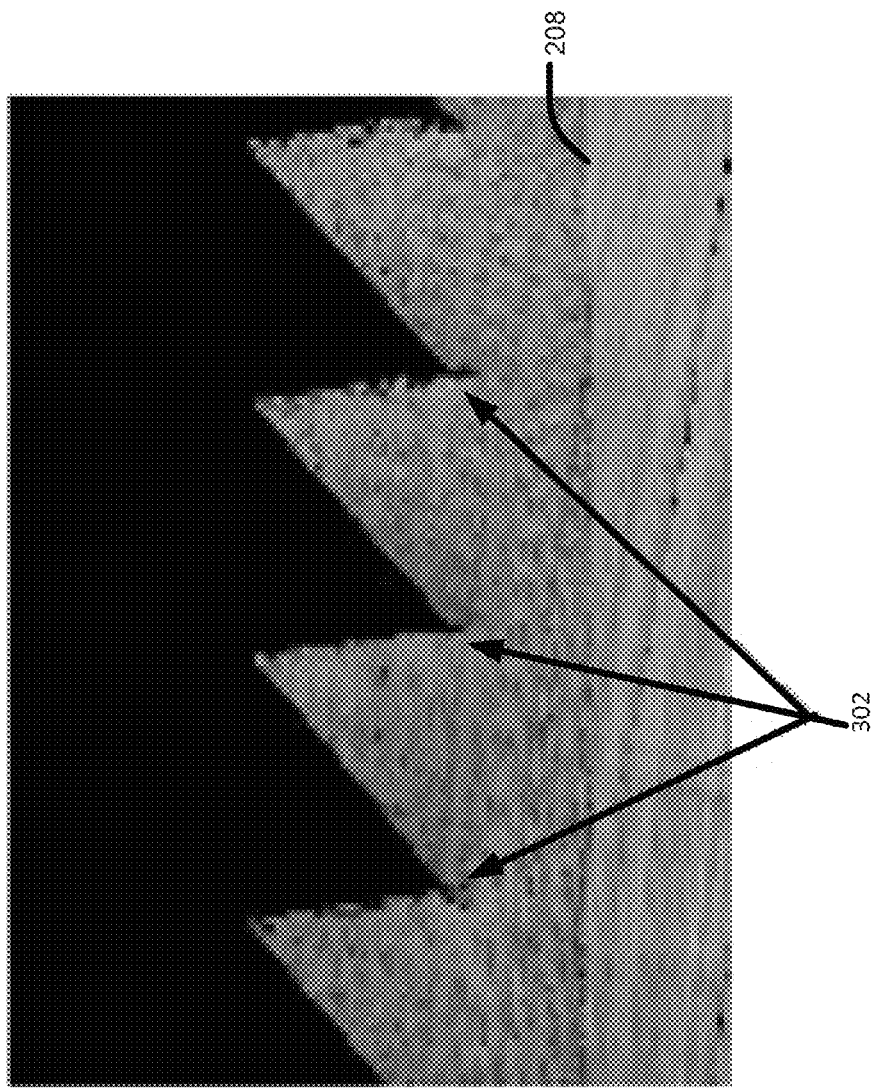
FIG. 3 shows a scanned image of a Fresnel lens shape having surface and shape irregularities due to manufacturing imperfections.

In some implementations, the grooves on the Fresnel lens shape can be formed directly using a diamond saw. The vibrations of saw blades and the imprecisions due to cutting speed and breakages in the raw lens material can lead to irregularities as well. FIG. 3 shows surface and shape irregularities 302 at the bottoms of the grooves in the Fresnel lens shape 304 prepared using a saw.

The surface and shape irregularities in the bottom corners of the grooves of the Fresnel lens shape can have dimensions in the range of 100 nm-10 microns for a prism pitch of 50-100 microns, and ridge height 40-80 microns. At these dimensions, the surface and shape irregularities can cause degradation to the optical performance of the Fresnel lens shape. For example, the surface and shape irregularities in the bottom corners of the grooves can cause scattering of light that leads to loss of transmission. In addition, the stray light from the scattering can cause reduced contrast in the image formed on the exit side of the Fresnel lens shape.

As shown in FIG. 4, when a ray of light 402 enters the Fresnel lens 400, and encounters the sloped lens facet 404 of the Fresnel lens 400, the light ray 402 will be bent into a prescribed direction according to the refractive power of the Fresnel lens 400. Some of the light will be reflected at the interface on the sloped lens facet 404. The reflected ray 406 may exit from a draft facet 408 of the Fresnel lens 400, leading to loss of transmission (the so-called "draft loss") in the direction prescribed by the lens facet 404 that had reflected the ray 402. Some of the incident rays (e.g., ray 410) can hit the surface and/or shape irregularities located at the bottom corners (e.g., the bottom corner 412) of the grooves in the grooved side of the Fresnel lens 400. These surface and shape irregularities include reflective and refractive facets that deviate from the designed planes of the lens facets and draft facets in the bottom corners of the grooves, and these reflective and refractive facets can cause the light rays (e.g., the ray 410) to scatter into different directions far from the direction prescribed by the designed planes of the lens facets and draft facets. The scattered light can lead to loss of transmission in the prescribed directions, and the stray light can also lead to loss of imaging contrast on the exist side of the Fresnel lens 400.

This specification describes methods for correcting the undesirable effects of the surface and shape irregularities in the bottom corners of the grooves on the groove side of a Fresnel lens body. In these methods, a fluid coating material is applied to the grooved side of the Fresnel lens body. The fluid coating material has a consistency thin enough to allow it to not only coat the entire lens surface on the grooved side of the Fresnel lens body, but also pool in the bottom corners of the grooves in the grooved side of the Fresnel lens body. The fluid coating material pooled in the bottom corners of the grooves can fill out the surface and shape irregularities in the bottom corners of the grooves. When the fluid coating material is dried, it solidifies, the solidified coating material fills out the surface and shape irregularities in the bottom corners of the grooves and provides an optical interface that is substantially along the designed planes of the lens facets and the draft facets of the grooves. These new optical interfaces replace the reflective and refractive facets of the surface and shape irregularities in the bottom corners of the grooves in the Fresnel lens surface, and cause more of the incident light to travel in the directions prescribed by the original designs for the lens facets and draft facets of the grooves.

Figure 5A:
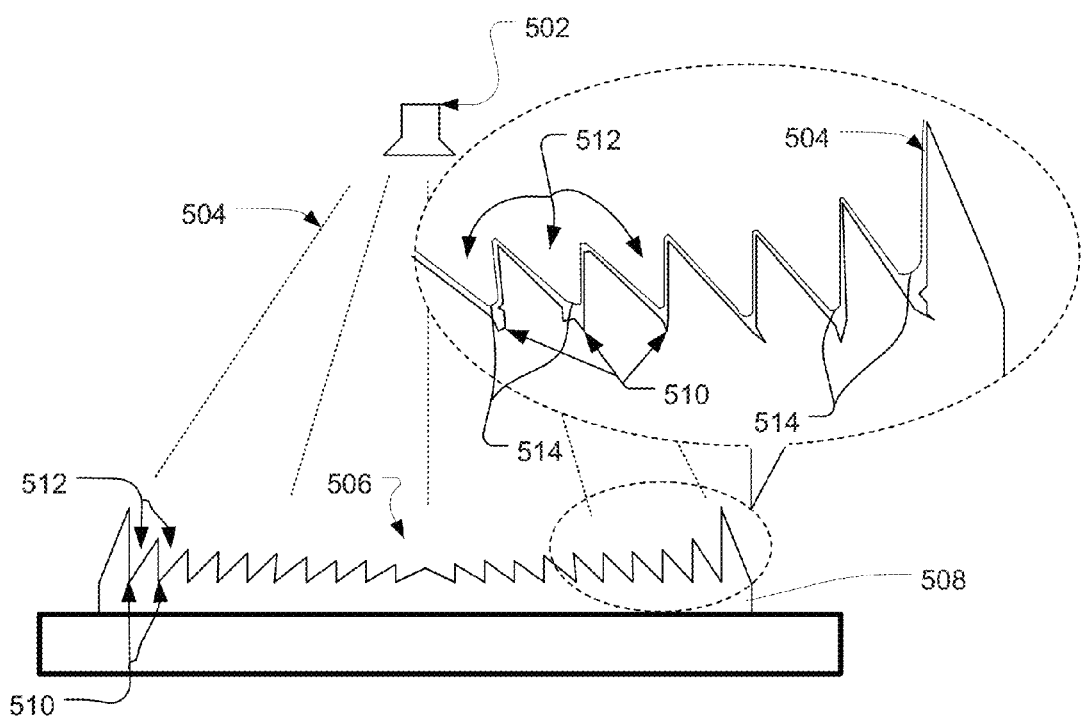
FIG. 5A is a block diagram illustrating an example process for applying a liquid coating to create meniscuses at the bottoms of the grooves in the Fresnel lens surface.

As shown in FIG. 5A, in some implementations, a spraying tool 502 can be used to spray a liquid-phase coating material 504 onto the grooved side 506 of a Fresnel lens body 508. The amount of liquid-phase coating is controlled so that it is enough to not only allow the coating material to cover the entire surface of the grooved side 506 of the Fresnel lens body 508, and have an access amount to flow and pool at the bottom corners 510 of the grooves 512 on the Fresnel lens surface. The liquid-phase coating material 504 can seep into the surface and shape irregularities at the bottom corners 510 of the grooves 512 in the Fresnel lens surface, and form a meniscus 514 at the bottom of each groove in the grooved side 506 of the Fresnel lens surface.

Typically, the shape and surface irregularities in the bottom corners of the grooves are most prominent for the lower 2-15% portion of the grooves. For groove depth (or ridge height) having dimensions of 50-100 microns, the surface and shape irregularities can be 150 nm-10 microns long or wide. The amount of liquid-phase coating material applied to the grooved side of the Fresnel lens body is sufficient to fill the lower 2-15% (e.g., 2-5%) of the grooves and form a meniscus at the bottom of each groove on the Fresnel lens surface.

In addition to the coating material pooled at the bottoms of the grooves, the rest of the surfaces on the grooved side of the Fresnel lens body are also covered by a thin layer of the liquid-phase coating material. The thickness of the liquid-phase coating material can be much smaller (e.g., 2-15%) on the surfaces of the upper portions of the grooves above the meniscuses formed near the bottoms of the grooves than the dimensions of the pooled coating material below the meniscuses. For example, the thickness of the coating material on the surfaces of the upper portions of the grooves (i.e., portions above the meniscuses) can be tens to hundreds of nanometers (e.g., 20 nm-150 nm), while the length and width of the coating material on the surfaces of the lower portions of the grooves (i.e., portions below the meniscuses) can be 2-10 microns.

In some implementations, the liquid coating material is a suspension of micro-particles of a low-refractive index material (e.g., porous silica particles, and/or nanoparticles of other low-refractive index materials). The micro-particles of the low-refractive index material can fill the surface and shape irregularities when the suspension dries and the particles settles onto the surface of the grooves on the grooved side of the Fresnel lens shape. A material having a refractive index lower than the refractive index of the underlying lens material and higher than the refractive index of air is considered a low-refractive index material for the purposes of coating and filling out the micro-defects on the lens surface. In addition, the refractive-index of pertinence is the refractive index of the solid film formed after the liquid coating material is dried. The dried coating material adheres closely to the lens surface on the grooved side of the Fresnel lens body, and forms an optical interface closely tracing the designed profiles of the lens facets and draft facets of the Fresnel lens body, except for at the very ends of the bottom corners of the grooves.

In some implementations, the solid film may one layer among several layers of materials coated on the Fresnel lens, and the several layers together form an anti-reflection coating for the Fresnel lens. The refractive indices and thicknesses of the different layers are determined by the design parameters of the anti-reflective coating, the wavelengths, and/or the incident angles of the incident light for the Fresnel lens.

Figure 5B:
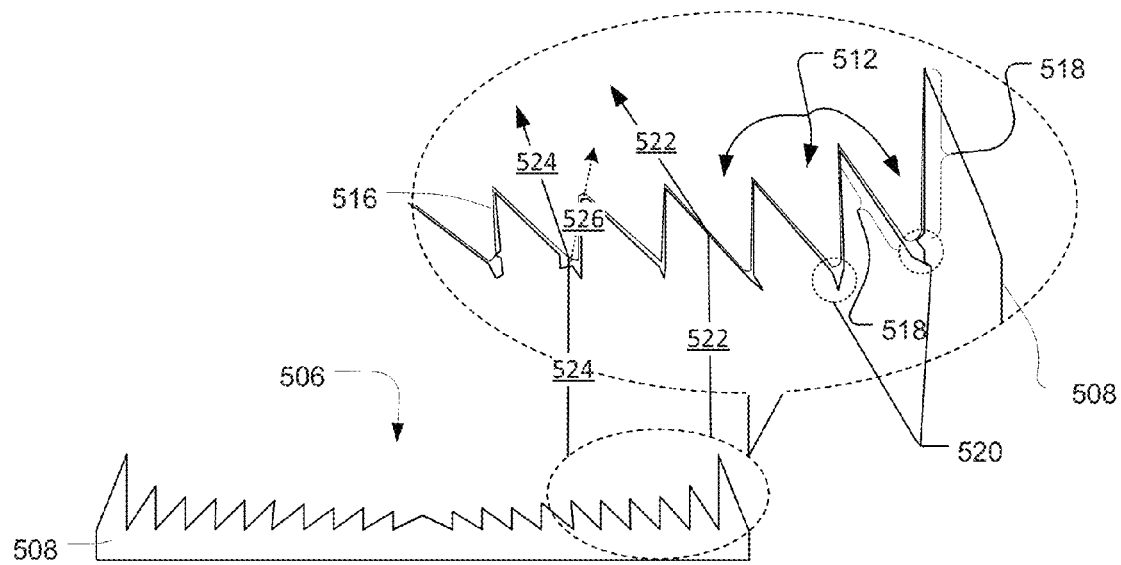
FIG. 5B is a block diagram illustrating the resulting Fresnel lens after the liquid coating solidifies and fills the surface and shape irregularities in the bottom corners of the grooves in the Fresnel lens surface.

As shown in FIG. 5B, the liquid-phase coating on the Fresnel lens surface is dried (e.g., by heating or evaporation) and solidified on the surface of the grooved side 506 of Fresnel lens body 508. In the enlarged view of a portion of the Fresnel lens body 508, it can be seen that the solidified coating material 516 has shrunken in volume due to the loss of the liquid base in the liquid-phase coating material 504. For example, 40% of the total volume can be lost after the coating is dried on the surface of the Fresnel lens body 508.

As shown in FIG. 4B, the solidified coating material 516 on the grooved side 506 of the Fresnel lens body 508 includes thin flat portions 518 over the upper surfaces of the lens facets and draft facets of the grooves 512. The solidified coating 516 also include thicker, protruding portions 520 filled in the bottom corners of the grooves 512. The thin flat portions 518 and the thicker protruding portions 520 alternate in the solidified coating 516. The upper surface of the solidified coating 516 provides the optical interfaces that closely trace the designed planes of the lens facets and draft facets of the Fresnel lens body 508. The lower surface of the solidified coating 516 adheres to the actual profile of the grooves 512 and fills out the surface and shape irregularities on the surface of the grooves 512, particularly in the bottom corners 510 of the grooves 512. The length of the protruded portions of the solidified coating 516 is about 10-20 times the thickness of the coating 516 in the flat portions of the solidified coating 516.

The solidified coating material 516 can have a lower refractive index (e.g., refractive index=1.33) than the lens material used for the Fresnel lens body 508 and a greater refractive index than air. The solidified coating material 516 can cause the optical transition at the surface of the Fresnel lens body 508 in the bottom corners 510 of the grooves 512 to be less abrupt than if no coating material was filling the surface and shape irregularities in the bottom corners 510 of the grooves 512. With the solidified coating material filling out the surface and shape irregularities in the bottom corners of the grooves, when light passes through the bottom portions of the grooves, the light rays are bended slightly rather than abruptly as they would have been if the light rays had encountered the facets of a surface or shape irregularity (e.g., a void in or protrusion from the lens facet). The light rays that have gone through the protruded portions 520 of the solidified coating 516 will bend again at the interface between the upper surface of the solidified coating 516 and the surrounding medium (e.g., air). Since the upper surface of the solidified coating material closely traces the designed profile of the grooves, the light rays are bent toward approximately the same direction as they would have been according to the original design of the Fresnel lens body 508.

As shown in FIG. 5B, a light ray 522 enters a sloped lens facet of a groove 512 and passes through the thin flat portion of the solidified coating 516. The light ray 522 is bent into a direction prescribed by the original design of the lens facet, because the coating 516 is very thin and has negligible effect on the direction of the ray 516 when the light ray 522 passes through the thin flat portion of the solidified coating 516.

Also shown in FIG. 5B, another light ray 524 is directed toward a portion of a lens facet that is near the bottom corner of a groove 512. A void exists at this portion of the lens facet, and has facets that deviate greatly from the design plane of the lens facet. If no coating material had filled out the void, the light ray 524 would be bent into a direction far from that prescribed by the designed plane of the lens facet, as shown by the dashed arrow 526. However, with the coating material 516 filling out the void, the light ray 524 only bends slightly as it passes through the interface between the lens body and the coating material. When the light ray 524 passes through the interface between the coating material and air, it is bent roughly in the same direction as prescribed by the designed plane of the lens facet, because the upper surface of the coating material closely traces the designed plane of the lens facet.

Because more of the rays that enter the Fresnel lens can follow optical paths that closely match those prescribed by the original lens design of the Fresnel lens, the total transmission loss due to the scattering is reduced, and the image contrast is improved.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this document.

What is claimed is:

1. A method for forming a Fresnel lens with corrected micro-defects, comprising:
   obtaining a Fresnel lens body, the Fresnel lens body including a unitary body of lens material shaped into a plurality of raised lens segments on a planar base, each pair of adjacent raised lens segments on the planar base forming a respective groove in a first side of the Fresnel lens body above the planar base, and respective bottom corners of one or more of the grooves including surface or shape irregularities deviating from respective designed surfaces of the grooves;
   applying a measured amount of a liquid coating material on the first side of the Fresnel lens body, where the measured amount of liquid coating material forms a meniscus within each of the respective bottom corners of the grooves; and
   solidifying the liquid coating material applied on the first side of the Fresnel lens body such that at least some of the liquid coating material below the meniscuses solidifies within and fills the surface or shape irregularities in the respective bottom corners of the one or more of the respective grooves.

2. The method of claim 1, further comprising:
   shaping a malleable material using a solid mold to form the plurality of raised lens segments on the planar base;
   causing the malleable material to harden within the solid mold to form the unitary body of lens material; and
   removing the unitary body of lens material from the mold to form the Fresnel lens body, where the surface or shape irregularities include defects caused by existing damages in the solid mold or by unclean removal of the Fresnel lens body from the solid mold.

3. The method of claim 2, wherein the malleable material is an acrylic paste.

4. The method of claim 2, wherein the defects have dimensions between approximately 100 nanometers and 10 microns.

5. The method of claim 2, wherein the solid mold is made of metal and includes a plurality of ridges that is operable to press into the malleable material to form the respective grooves in the first side of the Fresnel lens substrate, and wherein respective tips of the plurality of ridges include micro-deformities that caused at least some of the shape irregularities in the respective bottom corners of the grooves.

6. The method of claim 1, wherein applying the measured amount of the liquid coating material on the first side of the Fresnel lens body further comprises spray coating the first side of the Fresnel lens body with the measured amount of liquid coating material.

7. The method of claim 1, wherein the liquid coating material is a suspension of micro-particles made of a low-refractive index material.

8. The method of claim 1, wherein the measured amount of liquid coating material forms a uniform coating of 200 nm to 150 nm thick over surfaces of the plurality of raised lens segments, in addition to the meniscuses in the respective bottom corners of the grooves.

9. The method of claim 1, wherein each respective groove between a pair of adjacent lens segments has a width of approximately 50-100 microns.

10. A Fresnel lens with corrected micro-defects, comprising:
    a unitary body of solid lens material shaped into a plurality of raised lens segments on a planar base, each pair of adjacent raised lens segments on the planar base forming a respective groove in a first side of the unitary body above the planar base, and respective bottom corners of the grooves including surface or shape irregularities that deviate from respective designed surfaces of the grooves; and
    a layer of solid coating material coating the first side of the unitary body of solid lens material, the layer of solid coating material including flat portions over respective upper portions of the plurality of raised lens segments and protruded portions extending into the respective bottom corners of the grooves and filling the surface or shape irregularities in the respective bottom corners of the grooves.

11. The Fresnel lens of claim 10, wherein the layer of solid coating material comprises a low-refractive index material.

12. The Fresnel lens of claim 10, wherein the unitary body of solid lens material is acrylic or glass.

13. The Fresnel lens of claim 10, wherein the protruding portions have dimensions between approximately 2-10 microns.

14. The Fresnel lens of claim 10, wherein the flat portions have a thickness of approximately 20 nm-150 nm.

15. The Fresnel lens of claim 10, wherein each respective groove between a pair of adjacent lens segments has a width of approximately 50-100 microns.

16. The Fresnel lens of claim 10, wherein an exposed surface of the layer of solid coating material provides an optical interface that approximates a designed optical interface provided by the designed surfaces of the grooves in the respective bottom corners of the grooves.

17. A method, comprising:
 directing input light to a Fresnel lens, the Fresnel lens comprising:
  a unitary body of solid lens material shaped into a plurality of raised lens segments on a planar base, each pair of adjacent raised lens segments on the planar base forming a respective groove in a first side of the unitary body above the planar base, and respective bottom corners of the grooves including surface or shape irregularities that deviate from respective designed surfaces of the grooves; and
  a layer of solid coating material coating the first side of the unitary body of solid lens material, the layer of solid coating material including flat portions over respective upper portions of the plurality of raised lens segments and protruded portions extending into the respective bottom corners of the grooves and filling the surface or shape irregularities in the respective bottom corners of the grooves, and
 receiving output light from the Fresnel lens, wherein the output light includes light that has passed through the surface and shape irregularities of the grooves and been refracted by the protruded portions of the layer of solid coating material, and wherein the light is refracted by the protruded portions into respective directions that approximate respective directions prescribed by the designed surfaces of the grooves.

18. The method of claim 17, wherein the layer of solid coating material comprises a low-refractive index material.

19. The method of claim 17, wherein the protruding portions have dimensions between approximately 2-10 microns.

20. The method of claim 17, wherein the flat portions have a thickness of approximately 20 nm-150 nm.

21. The method of claim 17, wherein each respective groove between a pair of adjacent lens segments has a width of approximately 50-100 microns.

* * * * *